United States Patent [19]

Reed et al.

[11] Patent Number: 5,091,906

[45] Date of Patent: Feb. 25, 1992

[54] QUASI-DUPLEX RADIO SYSTEM USING BI-DIRECTIONAL HOLE EXTENSION

[75] Inventors: John D. Reed, Arlington; Walter J. Rozanski, Jr., Hurst; Charles N. Lynk, Jr., Bedford, all of Tex.

[73] Assignee: Motorola, Inc., Schaumburg, Ill.

[21] Appl. No.: 452,929

[22] Filed: Dec. 18, 1989

[51] Int. Cl.$^5$ .......................... H04J 3/24; H04B 3/20; H04L 5/16

[52] U.S. Cl. .................... 370/94.1; 370/31; 370/32; 455/58; 379/63

[58] Field of Search .............. 370/24, 31, 32, 94.1, 370/94.2, 95.1, 95.3; 379/59.63; 455/33, 34, 53, 54, 56, 58

[56] References Cited

U.S. PATENT DOCUMENTS

| | | |
|---|---|---|
| 4,056,779 | 11/1977 | Toler . |
| 4,672,601 | 6/1987 | Ablay ................................... 370/31 |
| 4,949,335 | 8/1990 | Moore ................................... 370/31 |

FOREIGN PATENT DOCUMENTS

0115618 A1  8/1984  Fed. Rep. of Germany .

Primary Examiner—Douglas W. Olms
Assistant Examiner—Wellington Chin
Attorney, Agent, or Firm—Michael J. Buchenhorner

[57] ABSTRACT

A method for interrupting a radio transmission in a quasi-duplex radio-frequency communication system. The method of the present invention includes the step of transmitting a signal (22), with periodically-occuring holes (24) therein, by a first communicatioin unit (10) to at least a second communication unit (12). The transmitted signal (12) includes an audio information portion (16) and information packets (23). Each information packet (23) specifies the time of occurence of the next hole (24). The second communication unit (12) initiates an interruption of the transmission made by the first communication unit (10) by transmitting an interrupt request signal (31) to the first communication unit (10) at a time specified by an information packet (23) received by the second communication unit (12). When the first communication unit (10) receives the interrupt request signal (31), it processes the interrupt request signal (23) to determine whether it complies with predetermined criteria. If the first communication unit determines that the interrupt request signal complies with the predetermined criteria, it transmits an acknowledgement signal allowing the second communication unit (12) to interrupt the transmission so that the second communication unit (12) may begin transmitting information to be received by at least the first communication unit (10).

24 Claims, 5 Drawing Sheets

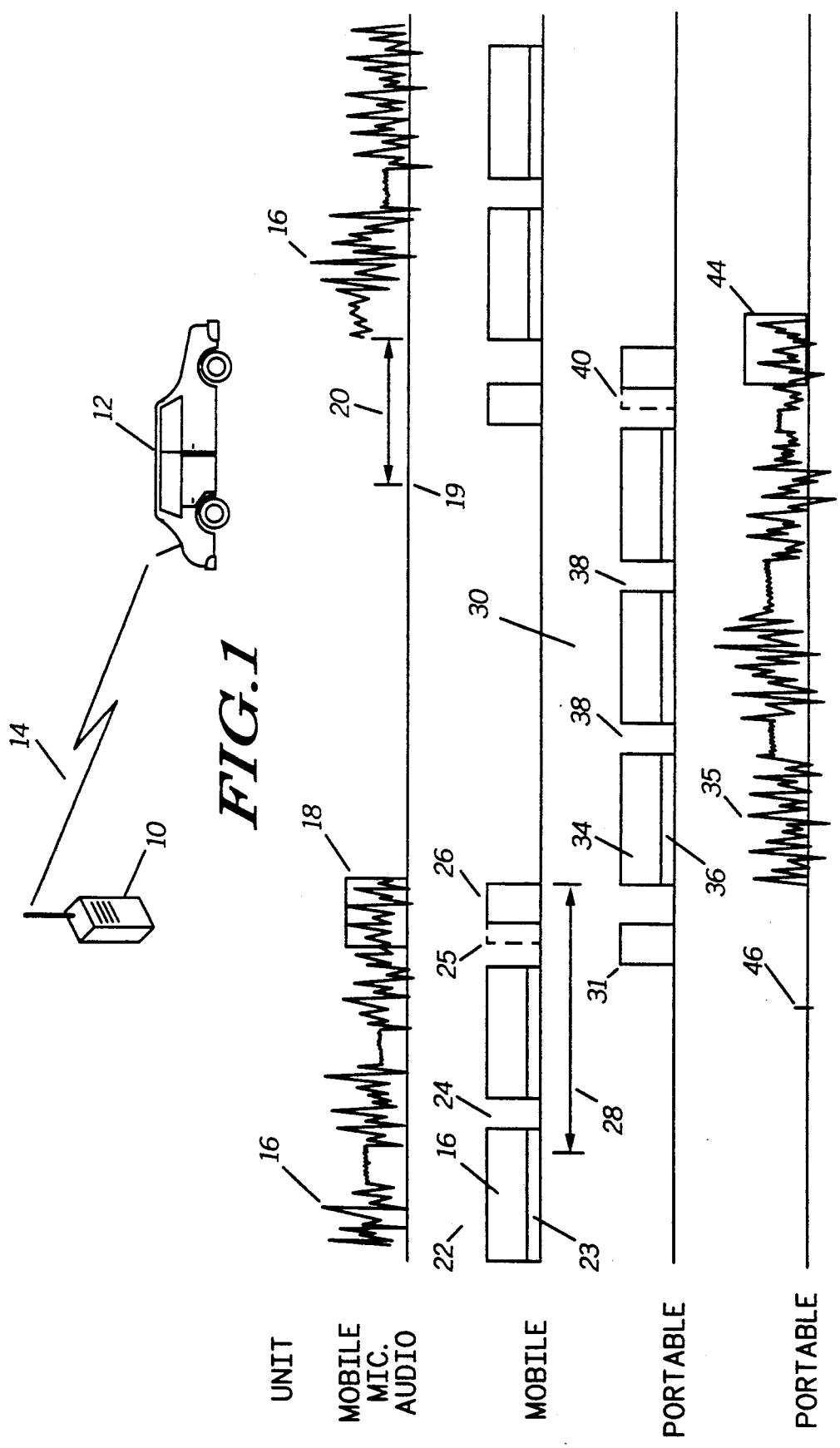

5,091,906

QUASI-DUPLEX RADIO SYSTEM USING BI-DIRECTIONAL HOLE EXTENSION

TECHNICAL FIELD

This invention relates generally to radio systems and more specifically to quasi-duplex radio systems.

BACKGROUND

Normally, duplex radios are expensive to build, are spectrally inefficient, and require duplexers. Methods other than full duplex presently being used for phone patch interconnects are lower cost, but are restrictive to conversation by requiring a push-to-talk (PTT) switch on one end and some type of talk permit indication on the other.

Quasi-duplex methods closely simulate full duplex operation, providing the user with a more natural and smoother-flowing conversation without the added cost of duplexers. Audio degradation may be present in the simplest quasi-duplex implementations; however, enhancement of performance, that can make a high tier system almost transparent to the user, is possible.

SUMMARY OF THE INVENTION

Accordingly, it is an object of the present invention to provide a quasi-duplex system without the detriments of the prior art.

Briefly, according to the invention, in a radio-frequency communication system, a method for interrupting a radio transmission is provided. The method of the present invention comprises the step of transmitting a signal, with a plurality of periodically-occurring holes therein, by a first communication unit to at least a second communication unit. The transmitted signal comprises an audio information portion and a plurality of information packets, each information packet specifying at least the time of occurrence of the next hole. The second communication unit initiates an interruption of the transmission made by the first communication unit by transmitting an interrupt request signal to the first communication unit at a time specified by an information packet received by the second communication unit. When the first communication unit receives the interrupt request signal, it processes the interrupt signal to determine whether it complies with predetermined criteria. If the first communication unit determines that the interrupt request signal complies with the predetermined criteria, it transmits an acknowledgement signal allowing the second unit to interrupt the transmission so that the second communication unit may begin transmitting information to be received by at least the first communication unit.

BRIEF DESCRIPTION OF THE DRAWINGS

FIG. 1 shows a communication system in which the protocol of the present invention may be used.

FIG. 2 shows a protocol with hole extension in accordance with the present invention.

DETAILED DESCRIPTION OF THE PREFERRED EMBODIMENT

Figure 3:
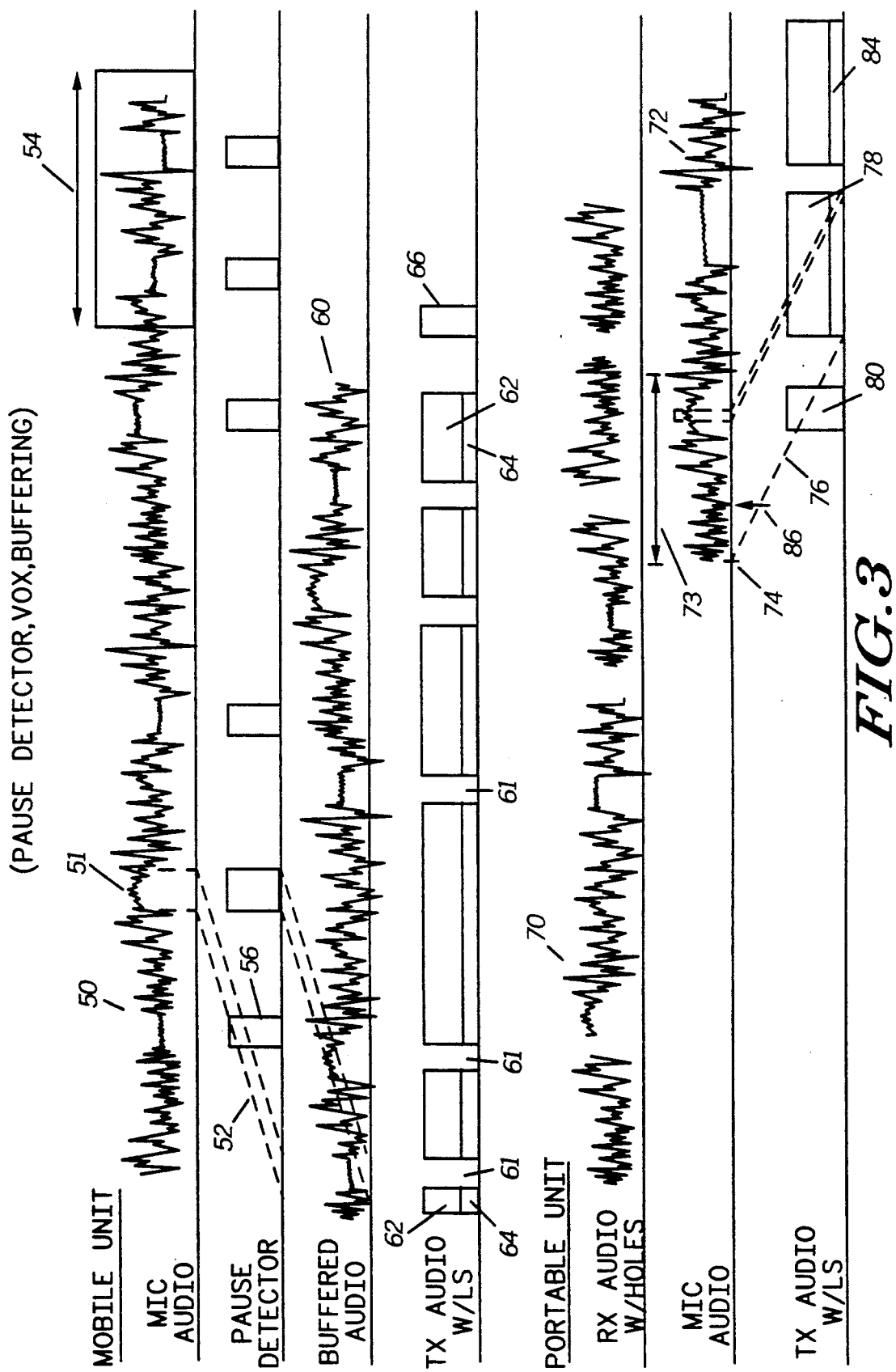
FIG. 3 shows another protocol with hole extension in accordance with the present invention.

Referring to FIG. 1, a mobile-portable system is shown, wherein a portable unit 10 communicates with a mobile unit 12 over a one or two frequency simplex channel 14. The quasi-duplex method of the present invention overcomes the detriments of the prior art, by providing a bi-directional hole extension protocol, with its appropriate signalling and control, that simulates full duplex operation. The quasi-duplex system of the invention uses a one or two frequency simplex channel 14 to communicate in either direction and allow interrupt capability to each user.

Referring to FIG. 2, as an example of the operation of the invention, the mobile unit 12 transmits an information signal 22, that includes an audio information portion 16 (e.g., representing a voice signal) and non-audible data information 23, to the portable unit 10. The signal 22 transmitted by the mobile unit 12 also contains a series of periodic gaps in the transmission (called holes) 24 that allow interruptions of the transmission. A user of the portable unit 10 may initiate an interruption of the transmission that is produced by the mobile unit 12, by activating a push-to-talk (PTT) switch, or a voice operated switch (VOX), in the portable unit 10. If interruptions in the transmission (changing the direction of the communication) are made fast enough, the communication system resembles a duplex system. Thus, the holes 24 "placed" in the transmitted signal 22 must be of short duration (preferably, 2-15 milliseconds) and must repeat several times per second (e.g., 2-8 times per second). The non-audible timing information 23 includes non-audible timing and identification information that locates the approximate position of the hole (in time) for the receiving end (i.e., the portable unit 10, in this example). With the information on the hole location, the portable unit 10 can mute, fill, mask, or otherwise cover the noise burst that will be received. DSP (digital signal processor) technology allows this hole processing to be done, based on numerous factors, such as signal strength, modulation, or others.

When the user of the portable unit 10 (the interrupting unit, in this example) initiates an interrupting signal 30, (e.g., by activating a PTT switch at a time 46) a sequence of events is triggered. First, an interrupt request data packet 31 is prepared within the portable unit 10, and then transmitted to the mobile unit 12. The hole time is checked to determine the time at which the next usable interrupt hole 24 will occur. An interrupting transmission 30 then commences—at some time before the interrupt hole 24 occurs so that a synthesizer (not shown) within the portable unit 10 can lock to the transmit frequency and the power amplifier (also not shown) can power up and the data filters (also not shown) can be initialized without any transient response at the moment the interrupting signal 30 is transmitted.

While the hole 24 is occurring, the mobile unit 12 (the interrupted unit, in this example) determines whether an interruption request signal (or data packet) 31 is being received from the portable unit 10. The interruption request signal 31 can comprise: a preamble; synchronization information; and encoded data. During this time, a received signal strength indicator (RSSI) detection is made by the mobile unit 12. If an acceptable signal level is detected and a portion of the data packet 31 is detected, the hole 24 is extended in duration (by a period 25) to receive more of the data packet. A high speed data correlation is done to detect a one/zero pattern during the hole 24. This corresponds to the preamble of the interruption request signal 31 being sent to interrupt the transmitting mobile unit 12.

Once the hole 24 is extended, based on a successful detection of the preamble of the interruption request signal 31, and RSSI the unit attempts to detect synchronization information. If any failure occurs in detecting an interruption request signal 31 or if an invalid command function is given, the hole extension (25) is aborted as soon as the problem is recognized, and normal transmission resumes. If the synchronization information is successfully received within a predetermined time, the hole 24 is extended further to read the encoded data which completes the interrupt request signal 31. Upon a successful reception of the interrupt request signal 31, an acknowledgement signal 26 (allowing interruption) is transmitted to the portable unit 10 to insure that each end of the system stays in synchronization. Then the roles of each radio unit (10 and 12) are reversed, thus completing the interruption process.

Once the interruption of the transmission of the mobile unit 12 by the portable unit 10 has taken place, the portable unit 10 assumes a transmission mode (with holes 38) until it ceases to transmit, on its own, or is interrupted. The interrupting transmission 30 comprises a transmitted audio information portion 34, non-audible timing information 36 (similar to the portions 16 and 23), and the high-speed interrupt request signal 31. A series of holes 38 are periodically placed in the signal 30. In the same manner as that relating to the interruption by the portable unit 10 of the transmission of the mobile unit 12, the mobile unit 12 may interrupt the transmission of the portable unit 10. Thus, the activation of a PTT switch at a time 19 initiates an interrupt procedure (when the channel 14 is available) identical to that already discussed. Moreover, the voice signal 16 must be delayed for a period 20 until the interrupt is complete (a talk permit tone could be provided by the interrupting unit). Portions 18 and 44 represent audio that is lost due to interruption.

Referring to FIG. 3, another approach for providing quasi-duplex operation is shown. In this embodiment, a VOX (not shown) is used to initiate the interruption. The periodicity of the holes in the embodiment of FIG. 2 simplified signalling. However, that is not the best approach for achieving superior audio quality. Since a normal conversation is replete with generally non-periodic pauses, it is beneficial to have the holes in the transmission coincide with the pauses in the voice.

The mobile unit 12 produces a microphone audio signal 50. A pause detector (not shown) is used to detect naturally-occurring pauses 51 in the voice signal 50, and generates a series of pulses 56 during those pauses. The pulses 56 are used to determine the timing of the holes in a transmitted audio information signal 62. A buffered delay (52) of the audio, producing buffered audio 60, allows for the encoding of the known hole location into non-audible timing information 64, to be transmitted to the receiving portable unit 10 prior to the transmission of the hole 61. In this way, timing of the interruption holes is made to coincide with the pauses 51 in the voice signal 50. Thus, the received audio signal 70 has holes that correspond to the pauses 51 in the microphone audio signal 50. These holes 61 can be processed by an audio algorithm; information on their location is already contained in the non-audible timing information 64.

The interruption is initiated by activation of a VOX that detects an audio signal 72 at a time 86. Then, as in the embodiment depicted in FIGS. 1 and 3, the non-audible timing signal 64 sent by a transmitting unit, indicates to the interrupting unit 10 when to transmit the high-speed interruption request signal 80. A non-audible timing information and identification signal 84 and an audio information portion 78 are also transmitted by the portable unit 10.

Voice interruption begins at time 74. If a pause 51 in the microphone voice signal 50 has not been found after a certain amount of time, the threshold of the pause detector can be decreased so that a hole is forced into the transmitted conversation. Thus, if the other user were waiting to interrupt, there would be a fixed amount of time for purposes of buffer length and wait time. Any audio (50) in the buffer at the time of the interruption request 80 will be lost (54) because the buffering is halted in the process. The new received audio signal (a delayed version of the microphone audio signal 72, not shown) is available at the speaker of the interrupted unit. A portion of the microphone audio signal 72 of the interrupting unit is buffered (76) while the direction of transmission is reversed. Therefore, none of the initial part (73) interrupting microphone audio 72 is lost.

Figure 4:
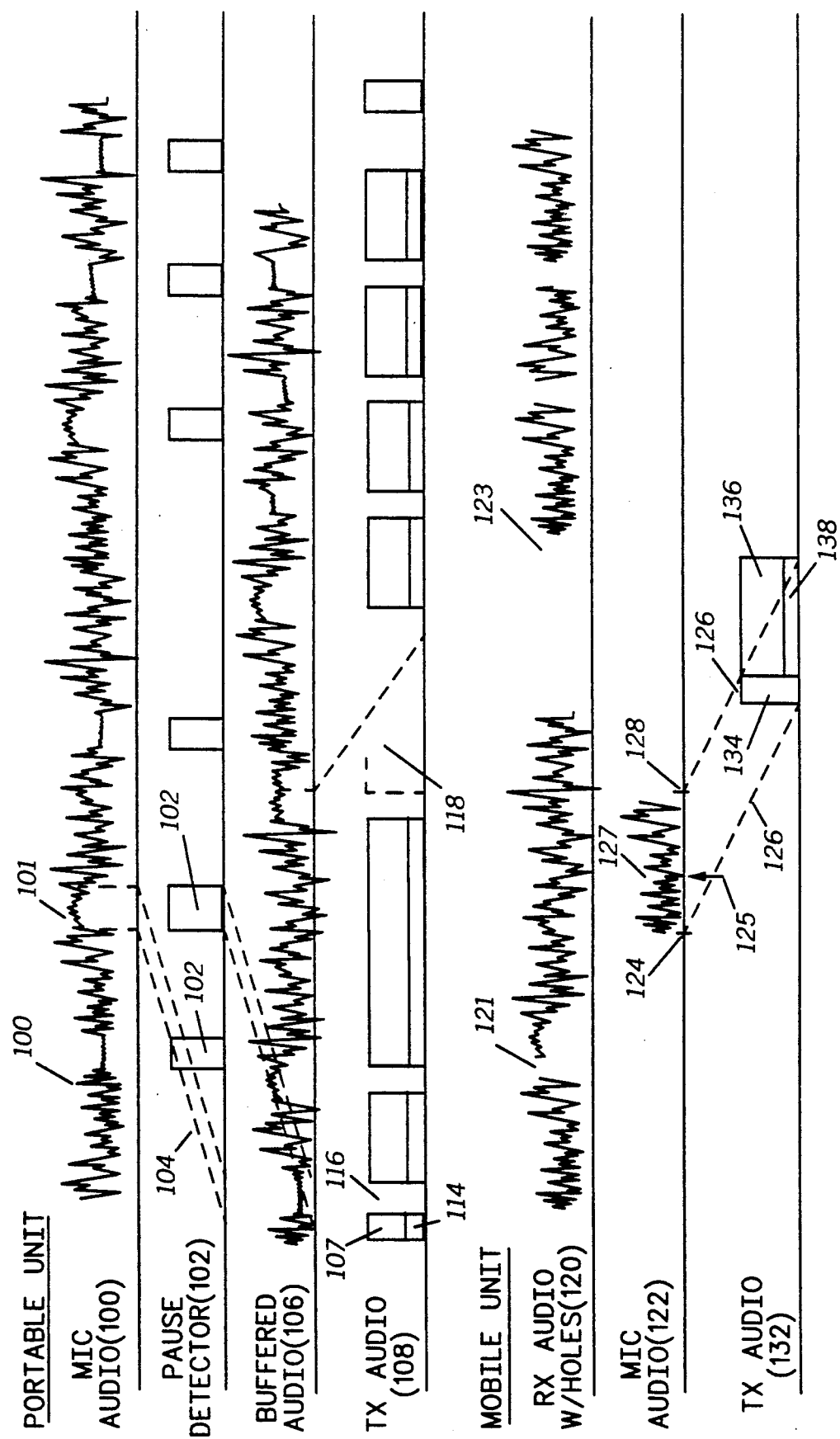
FIG. 4 shows still another protocol with hole extension in accordance with the present invention.

Referring to FIG. 4, another approach for a quasi-duplex protocol is shown. This approach is used for short interrupts (i.e., short utterances made during speech that are not generally meant to interrupt the communication). A microphone audio signal 100 at the portable unit 10 includes a plurality of naturally-occurring pauses 101. A pause detector (not shown) in the portable unit 10, detects the timing of the pauses 101. A buffered audio signal 106 is produced in the portable unit 10 so that it is stored and delayed with respect to the microphone audio signal 100. The delay (104) allows non-audible timing information 114 to be sent prior to the hole, informing the mobile unit 12 when the interrupt holes occur. The pause detector generates a series of pulses 102 that determine the timing for the holes 116 in a transmitted signal 108, so that the holes 116 coincide with the holes (or gaps) in the audio 100. The transmitted signal 108 also includes the buffered audio information signal 107 and a non-audible timing information and identification signal 114.

The mobile unit 12 receives, demodulates, and obtains an audio signal 120 with holes 121. When the user of the mobile unit 12 seeks to interrupt the portable unit's transmission, the user needs to to talk into the microphone, if a VOX is used, (or activate a PTT switch, if a VOX is not used) that causes the portable unit 10 to initiate an interruption sequence. The VOX detects the interrupting speech 127 at a time 125. It is evident from FIG. 4 that there is some delay between the VOX detection and the beginning of the speech of the portable unit's user. Thus, the signal 127 is stored and delayed (126) so as to allow the portable unit 10 to determine whether there occurred a short interrupt and to determine exactly how long it lasted (i.e., the time between the beginning of the voice interrupt 124 and its end 128). If the length of the interrupt is sufficiently short the interruption will be called a "short interruption." If a PTT switch is used, the initiation of the interruption procedure begins at time 124, instead of time 125. Once the short interrupt determination is completed (at a time 128) the mobile unit 12 produces an interrupting signal 132 that is transmitted to the portable unit to cause the interruption. The interrupting signal 132 comprises a high-speed interrupt request 134, a non-audible timing information and identification portion 138, and an audio information portion 136. The audio buffer increases in size (118) when a short interruption is inserted. Thus, no audio is lost. Since the insertion of the short interruption is made at a pause in the transmitted audio 116 (corresponding to a pause in speech 101), the interruption does not break apart or corrupt any words, but only affects the length of the pauses 123 between the words in the received audio 120.

Figure 5:
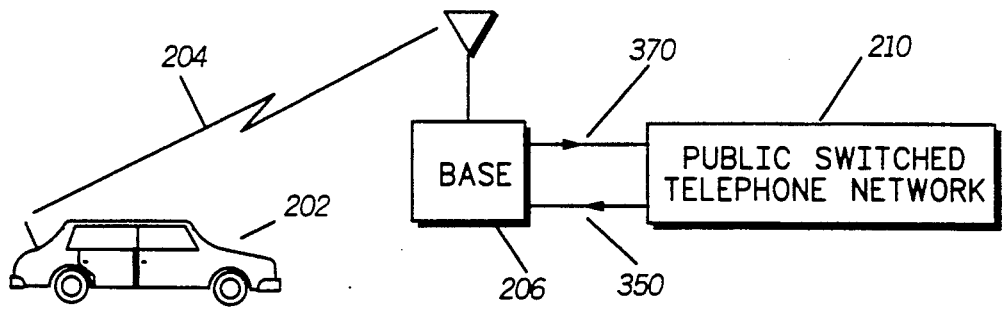
FIG. 5 shows a mobile/telephone communication system.

Referring to FIG. 5, a telephone interconnect system 200 comprising a mobile unit 202, a base 206, and a telephone network 210, is shown. This system uses a normal two-frequency simplex channel 204, to communicate in either direction and, with the invention, will allow interrupt capability to each user. Thus, the mobile (202) user that is receiving a message can easily respond to the telephone (210) user by an interrupt of the radio channel 204 initiated by activation of a PTT switch or VOX. The telephone (210) user can likewise interrupt the mobile (202) user by simply talking. The telephone (210) transmission is VOX operated. The VOX causes a process to be initiated for the interruption of the channel 204, that will allow the telephone (210) user to talk to the mobile unit 202. Buffering of the voice before, and after the VOX detection prevents any loss of voice during the interrupting process. If these interruptions (changing the direction of the conversation) can be made fast enough, the system 200 will resemble a full duplex communication channel.

Figure 6:
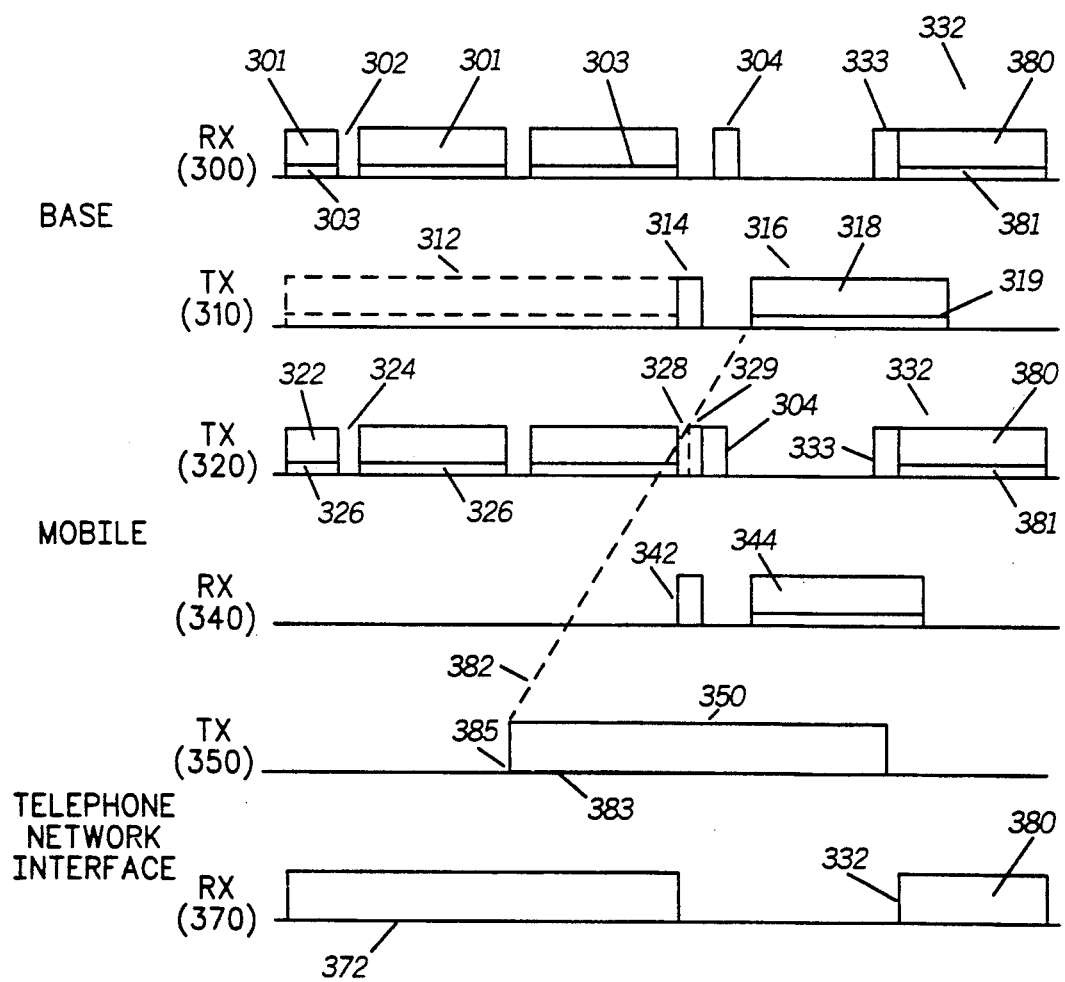
FIG. 6 shows a set of protocols with hole extension that may be used in a communication system such as the one shown in FIG. 5.

Referring to FIG. 6, a quasi-duplex protocol used in the telephone interconnect system 200 is shown. The mobile unit 202 transmits a signal 320 with a plurality of holes 324 having short duration (e.g., 2-40 milliseconds, depending on the implementation) periodically placed therein. The holes 324 in the signal 320 allow the receiving base 206 to interrupt the transmission. These holes 324 may occur 2-8 times per second. The base 206 receives a signal 300 that corresponds to the signal 320 transmitted by the mobile 202. The received signal 300 comprises, non-audible timing information 303 (corresponding to the non-audible timing information 326); a series of holes 302 (corresponding to the holes 324); and an audio information portion 301 (corresponds to the audio information portion 322). The telephone network 210 receives the signal 370 from the base 206. The signal 370 comprises an audio portion 372. The signal 370 does not have any holes therein because of the processing performed at the base 206. The signal 320 includes an information portion 322 and a non-audible timing and ID information 326 which is transmitted to the base 206. The signal 326 indicates the position (i.e., timing) of the holes 324 for the base 206. With the hole location information, the base 206 receiving the signal 320 can mute, fill, or otherwise cover up the received noise burst (not shown). This noise processing can be done with known DSP technology. Typical ways of doing this include back filling the hole by copying part of the previous speech and part of the subsequent speech into the hole. Voice synthesis techniques can be also used for this purpose.

The base 206 may then (if desired) re-transmit the signal 300 without the holes (resulting in a continuous transmission 312). The re-transmitted audio signal 312 may be delayed by the mask/fill process.

INTERRUPTING THE MOBILE

When the user of the telephone network (210) speaks into the telephone to interrupt, the telephone interconnect hardware (conventional hardware, not shown) detects this speech by a VOX (also not shown) at the base end 206, and causes an interrupt procedure to begin. First, the base unit 206 prepares an interrupt request signal 314 for transmission. Next, the time of occurrence of the next usable hole (328) is determined. Then the transmission of the signal 314 begins some time before the interrupt hole 328, so that a synthesizer (not shown) can lock to the transmit frequency and the power amplifier (not shown) of the base unit 206 can power up (if necessary) and its data filters (also not shown) can be initialized without any transient response at the moment the interrupting data is sent. Upon receiving a portion of the data packet 342, the hole 328 is extended by a length 329 at the mobile (202), and the remaining interrupt request signal 342 is received at the mobile (202). An acknowledgement signal 304 is then transmitted by the mobile 202. The channel 204 is then given to the telephone network 210 for transmission of a signal 316 (that includes a delayed voice portion 318 and non-audible timing information 319) which represents the original telephone audio signal 350.

A VOX (not shown) in an interface to the telephone network 210 may receive an audio signal 350 from a user, beginning at a time 385, to initiate an interruption of the mobile unit's transmission 320. The interruption is actually initiated at a time 383 (shortly after the time 385) when the VOX detects the signal 350. The signal 350 is buffered by the telephone network interface (not shown) in the base unit 206. Since the buffered signal is stored and then replayed after the interruption is acknowledged, a delay is caused.

INTERRUPTING THE TELEPHONE USER

An interruption process by the mobile unit 202 may begin by the activation of a PTT switch or a VOX (not shown) in the mobile unit 202, which causes transmission of an interrupting signal 332 (that includes an interrupt request portion 333, an audio information portion 380, and non-audible timing information 381.

When the base 206 is transmitting audio from the telephone network 210 to the mobile 202, the repeater input frequency is not being used. Since the base 206 can receive a signal at the same time that repeater is transmitting, it is available to receive the interruption request signal 333 from the mobile 202. This request does not have to be acknowledged by the base 206 since any failure to decode the high speed data request can be recovered from, by receiving the non-audible timing information. Thus the channel 204 will be immediately reversed at the time that the mobile 202 is interrupting, giving the mobile 202 the ability to talk and be heard. Since the base 206 is transmitting voice audio without holes during the time the telephone network (210) user is talking, there is no degradation due to holes.

When the mobile transmission 320 is received, the base 206 processes the holes 302 in the received signal 300, to make the received audio signal 370 sound continuous. Now, this processed voice can be sent to the telephone network 210 and can be transmitted by the base 206 to other mobiles, if desired. This improved transmission no longer has any holes because the base has filed in those holes. Thus, any radio can receive this signal without special hardware. The only noticeable audio degradation will be a short data packet that occurs when the conversation is interrupted by the base. Mobile interruptions are processed by the base control unit 206 and will be muted. The interrupting data burst may last: 10 to 100 milliseconds (for example) depending on data packet design.

COMPRESSION

When the mobile unit 202 produces the transmission 320 in a Quasi-Duplex Telephone Interconnect Mode, the holes 324 are placed in the radio-frequency (RF) signal 320. By doing this, part of the voice information 322 is lost. Means to reconstruct the voice may be used to make the received audio sound acceptable, but not perfect.

By using well-known audio compression techniques, the audio information signal 322 can be compacted so as to make room for the holes 324, to prevent loss of information. The base 206 could then expand the audio information signal 322 back to its original form for transmission. This would be the optimum system to preserve the integrity of the communication. It would however, require voice sampling and buffering in a digital memory, within the mobile unit 202, along with other hardware for control. In addition, some of the normal voice bandwidth would be lost because the compressed voice would most likely have to fit into standard channel specifications, although this would be a minimal effect at a typical speed up of ten %.

GENERAL SYSTEM APPROACH FOR BASE SITE AUDIO PROCESSING

With a mobile or portable radio equipped with some basic signalling hardware (e.g., a microcomputer such as the 68HCO5C4 model, manufactured by Motorola Inc.), RF signals with holes can be transmitted, as described earlier, with the base acting as the audio correction system. The base can fill, or decompress the audio for repeating to others. By building the system in this way, mobile, or portable units could operate in the Quasi-Duplex mode without requiring DSPs, or other items to do audio fix-up.

CONTROL STATION AND MOBILE TO MOBILE OPERATION

Figure 7:
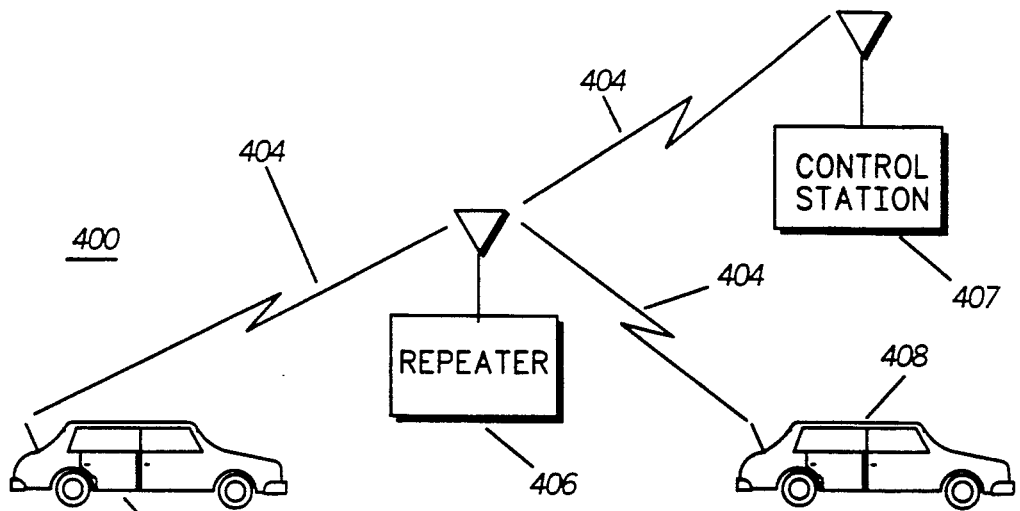
FIG. 7 shows a mobile/mobile communication system.

Referring to FIG. 7, a control station/mobile unit/repeater communications system 400 is shown. The system 400 comprises a first mobile unit 402, a second mobile unit 408, a control station 407, and a repeater 406. These units communicate through a two-frequency simplex channel 404. In this case a control station is used as a remote base. The operation of the system is exactly the same as that of a mobile-to-mobile communication system because of the way in which the control station 407 operates; it transmits on the repeater input frequency, like a mobile, and it receives on the repeater output frequency like a mobile.

Figure 8:
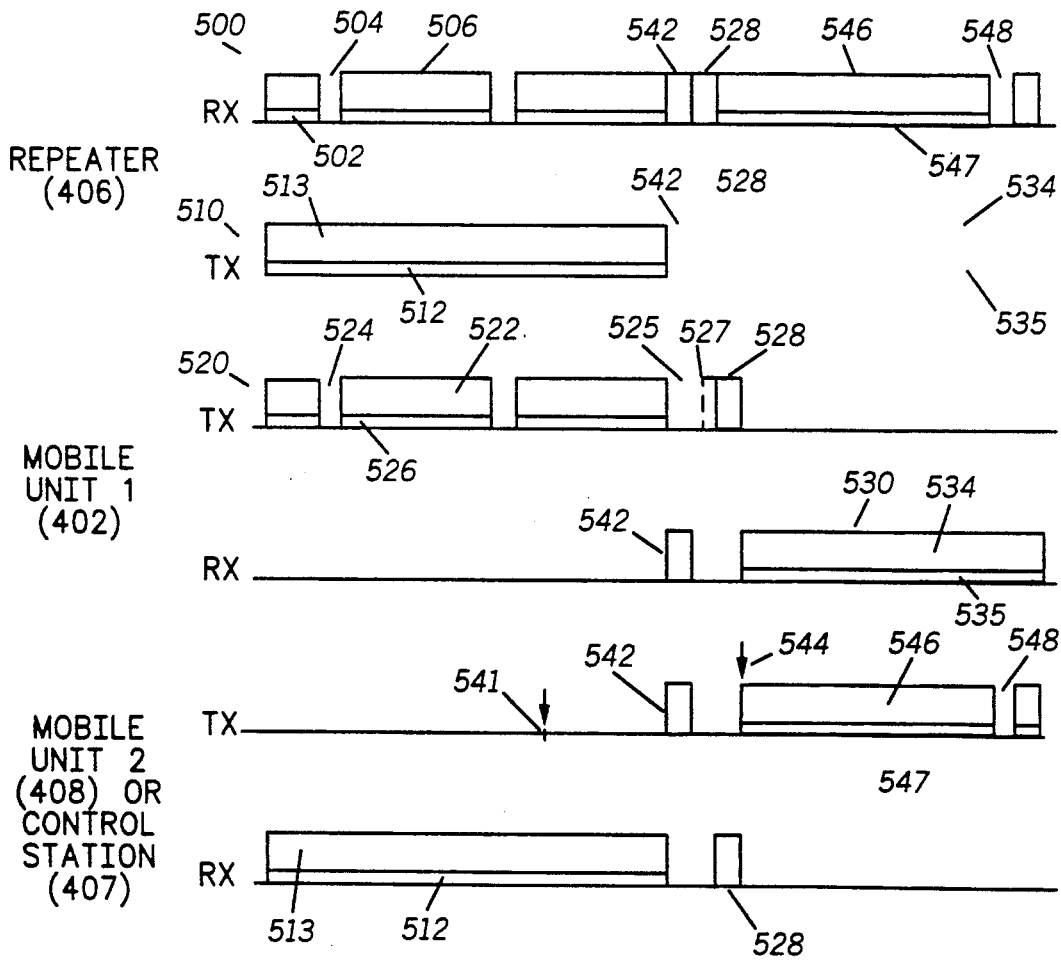
FIG. 8 shows a set of protocols with hole extension that may be used in a communication system such as the one shown in FIG. 7.

Referring to FIG. 8, a set of protocols used in a mobile-to-mobile communication system (such as the one illustrated in FIG. 7), is shown. In the cases of control-station and mobile-to-mobile communications, interrupt holes must be placed in both transmissions. The repeated signal will still be processed to remove the holes. The first mobile unit 402 produces a transmission 520 that includes an audio information portion 522, a plurality of periodic interrupt holes 524, and non-audible timing information 526. The repeater 406 receives a signal 500 that includes non-audible timing information 502, a plurality of interrupt holes 504, periodically placed into the signal 500, and an audio information portion 506. The repeater 406 produces a transmission 510 that includes non-audible timing information 512 and an audio information portion 513. The transmission 510 does not contain holes because repeater 406 fills in the holes 504 in the received signal 500. The second mobile unit 408 (or control station 407) receives the non-audible timing information 512 and the audio information portion 513.

An interruption of the transmission 520 of the first mobile unit 402 may be initiated by activating a PTT switch (not shown) in the second mobile unit 408 (or control station 407), at a time 541. The second mobile unit 408 (or control station 407) then waits for the next hole 525 in the transmission 520 to transmit an interrupt request signal 542. The repeater 406 receives and re-transmits the signal 542. The first mobile unit 402 receives the interrupt request signal 542. If the carrier energy associated with the signal 542 is determined to be of a predetermined level, and/or a portion of the signal (i.e., data packet) 542 is detected, the hole 525 is extended for a period 527 until the complete signal 542 is received, or until the incoming signal is determined not to be the correct data packet (at which time, normal transmission 520 continues). If detection of the signal 542 is successful, an acknowledgement signal 528 is transmitted by the first mobile unit 402, thus allowing interruption of the transmission 520 to be completed. The repeater 406 receives the signal 528 and re-transmits it. The second mobile unit 408 then produces a talk permit tone (if desired) at time 544, notifying its user to begin talking. The second mobile unit then begins a transmission, that includes an audio information portion 546 and non-audible timing information 547 (and has holes 548 therein). The repeater 406 receives the transmission 540 and re-transmits an audio information portion 534 (corresponding to the portion 546) and non-audible timing information 535 (corresponding to the portion 547) with the holes 548 filled in. The first mobile unit 402 then receives a signal 530, which includes the audio information portion 534, and the non-audible timing information 535.

What is claimed is:

1. In a radio-frequency communication system, a method for interrupting a radio transmission, comprising the steps of:
    (a) receiving an information signal with a first communication unit;
    (b) transmitting a first signal, having a plurality of periodically-occurring holes of a predetermined duration, with the first communication unit, the first signal comprising an audio information portion, representing the information signal, and at least one information packet, specifying when at least one of the plurality of periodically-occurring holes will occur in the first signal;
    (c) receiving the first signal with a second communication unit;
    (d) transmitting an interruption request signal with the second communication unit at a time when at least one of the plurality of periodically-occurring holes is occurring in the first signal, as specified by at least one information packet that is received with the second communication unit;

(e) detecting at least a portion of the interruption request signal with the first communication unit to determine whether the detected portion complies with a first set of predetermined criteria; and (f) interrupting the transmission of the first communication unit, with the first communication unit, responsive to step (e), so that the second communication unit may begin transmitting information to be received by at least the first communication unit.

2. The method of claim 1 further comprising the steps of:

(e 1) extending the duration of the hole occurring at the time that the first communication unit detects the detected portion of the interruption request signal, with the first communication unit, when the detected portion of the interruption request signal complies with the first set of predetermined criteria;

(e 2) processing the interruption request signal with the first communication unit, to determine whether the interruption request signal complies with a second set of predetermined criteria;

(e 3) transmitting an acknowledgement signal with the first communication unit when the first communication unit determines that the interruption request signal complies with the second set of predetermined criteria, the acknowledgement signal allowing the second communication unit to interrupt the transmission; and (e 4) detecting the acknowledgement signal with the second communication unit.

3. The method of claim 2 wherein the first set of predetermined criteria comprises: whether the interruption request signal is of at least a predetermined level.

4. The method of claim 2 wherein the first set of predetermined criteria comprises: whether correlation of the interruption request signal to an expected signal produces a value that is of at least a predetermined quantity.

5. The method of claim 1, further comprising the steps of:

(a 1) sampling the information signal at a first rate, with the first communication unit, to produce a sampled information signal;

(a 2) storing the sampled information signal, with the first communication unit;

(a 3) modulating the information signal, with the first communication unit, at a second rate; and (c 1) decoding the first signal with the second communication unit, to provide a reconstructed information signal that is substantially identical to the information signal.

6. The method of claim 1, wherein step (c) comprises the steps of:

(c 1) initiating an interruption of the transmission with the second communication unit by applying an audio signal to an audio-operated-switch in the second communication unit; and (c 2) storing a portion of the audio signal with the second communication unit.

7. The method of claim 6, further comprising the step of:

(g) transmitting a second signal with the second communication unit, the second signal comprising the portion of the audio signal that was stored.

8. In a radio-frequency communication system, a method for interrupting a radio transmission, comprising the steps of:

(a) transmitting a first signal, having a plurality of periodically-occurring holes of a predetermined duration, with a first communication unit, the first signal comprising an audio information portion and at least one information packet, specifying when at least one of the plurality of periodically-occurring holes will occur;

(b) receiving the first signal with a second communication unit;

(c) receiving voice information having a duration shorter than a predetermined period, with the second communication unit;

(d) modulating a radio-frequency carrier with the voice information, to produce a modulated signal;

(e) transmitting a second signal having a portion comprising the modulated signal and a portion comprising a request for a short interruption, with the second communication unit at a time when at least one of the plurality of periodically-occurring holes is occurring in the first signal, as specified with an information packet that is received with the second communication unit;

(f) detecting at least a portion of the interruption request signal with the first communication unit;

(g) extending the duration of the hole occurring at the time that the first communication unit receives the detected portion of the second signal, with the first communication unit, for a period long enough to allow reception of the signal;

(h) demodulating the second signal with the first communication unit, to provide a demodulated signal; and (i) presenting the demodulated signal to a person using the first communication unit, with the first communication unit.

9. In a radio-frequency communication system, a method for interrupting a radio transmission, comprising the steps of:

(a) receiving an audio signal representing speech having a plurality of naturally-occurring pauses therein, with a first communication unit;

(b) storing the audio signal for a predetermined period with the first communication unit;

(c) transmitting a first signal, with a first communication unit, after the predetermined period, the first signal comprising a plurality of holes of a predetermined duration, an audio information portion, and at least one information packet, specifying when will occur in the first signal, each hole coinciding in time with a pause in the speech represented with the audio signal;

(d) receiving the first signal with a second communication unit;

(e) transmitting an interruption request signal with the second communication unit at a time when at least one of the plurality of holes is occurring in the first signal, as specified with an information packet that is received with the second communication unit;

(f) detecting at least a portion of the interruption request signal with the first communication unit;

(g) extending the duration of the hole occurring at the time that the first communication unit detects the detected portion of the interruption request signal, with the first communication unit;

(h) processing the interruption request signal with the first communication unit, to determine whether the interruption request signal complies with predetermined criteria;

(i) transmitting an acknowledgement signal with the first communication unit when the first communication unit determines that the interruption request signal complies with the predetermined criteria, the acknowledgement signal allowing the second communication unit to interrupt the transmission;

(j) detecting the acknowledgement signal with the second communication unit; and (k) interrupting the transmission of the first communication unit so that the second communication unit may begin transmitting information to be received by at least the first communication unit.

10. In a quasi-duplex communication system comprising a mobile communication unit, a base unit, and a telephone network interface, a method of interrupting a transmission comprising the steps of:

in the mobile communication unit:

(a) receiving an information signal;

(b) transmitting a first signal, having a plurality of periodically-occurring holes of a predetermined duration, the first signal comprising an audio information portion and at least one information packet, specifying when at least one of the plurality of periodically-occurring holes will occur in the first signal;

(c) detecting at least a portion of an interruption request signal to determine whether the detected portion complies with a first set of predetermined criteria;

(d) extending the duration of the hole occurring at the time that the mobile communication unit detects the detected portion of the interruption request signal, when the detected portion complies with a first set of predetermined criteria, to read the interruption request signal;

(e) processing the detected portion of the interruption request signal, to determine whether the interruption request signal complies with a second set of predetermined criteria;

(f) transmitting an acknowledgement signal when the mobile communication unit determines that the interruption request signal complies with the second set of predetermined criteria, the acknowledgement signal allowing an interruption of the transmission;

(g) receiving a second signal;

(h) transmitting a second interruption request to the base unit followed by a third signal having a plurality of periodically-occurring holes of a predetermined duration, the third signal comprising an audio information portion and at least one of the plurality of periodically-occurring holes will occur in the third signal;

in the base unit:

(a) receiving the first signal;

(b) approximating the part of the information signal that was removed therefrom to make the holes in the first signal, to produce approximate information;

(c) filling at least some of the plurality of periodically-occurring holes with the approximate information to produce a continuous first signal;

(d) transmitting the continuous first signal to at least the telephone network interface;

(e) detecting a need for an interruption of the first signal by detecting the second signal from the telephone network interface;

(f) producing a first interruption request;

(g) transmitting the first interruption request to the mobile unit at a time when at least one of the plurality of periodically-occurring holes is occurring in the first signal, as specified by an information packet that is received by the base unit;

(h) receiving the acknowledgement signal transmitted by the mobile unit; and (i) processing the acknowledgement signal within the base unit to determine whether to transmit;

(j) interrupting the transmission of the mobile unit when a determination is made to transmit, so that the telephone network interface may begin transmitting information through the base;

(k) receiving the second interruption request and the third signal from the mobile communication unit;

(l) approximating the parts of the information signal that were removed therefrom to make the holes in the third signal, to produce approximate information;

(m) filling the holes with the approximate information to produce a continuous third signal;

(n) transmitting the continuous third signal to at least the telephone network interface;

in the telephone network interface:

(a) receiving the continuous first signal;

(b) transmitting a second signal comprising an audio information portion to the base unit; and (c) receiving the audio information portion of the third signal transmitted by the base unit and providing the audio information portion of the third signal to at least a user of the telephone network interface.

11. In a quasi-duplex communication system comprising a mobile communication unit, a base unit, and a telephone network interface, a method of interrupting a transmission comprising the steps of:

in the mobile communication unit:

(a) receiving an information signal;

(b) sampling the information signal at a first rate to produce a sampled information signal;

(c) storing the sampled information signal;

(d) modulating the sampled information signal at a second rate to produce a compressed audio information portion;

(e) transmitting a first signal, having a plurality of periodically-occurring holes of a predetermined duration, the first signal comprising the compressed audio information portion and at least one information packet, specifying when at least one of the plurality of periodically-occurring holes will occur in the first signal, each hole occurring during a gap in the first signal caused by compression of the audio information portion;

(f) detecting at least a portion of an interruption request signal to determine whether the portion complies with a first set of predetermined criteria;

(g) processing the interruption request signal, to determine whether the interruption request signal complies with a second set of predetermined criteria;

(h) transmitting an acknowledgement signal when the mobile communication unit determines that the interruption request signal complies with the predetermined criteria, the acknowledgement signal allowing an interruption of the transmission;

(i) receiving a second signal;

(j) transmitting a second interruption request to the base followed by a third signal having a plurality of periodically-occurring holes of a predetermined duration, the third signal comprising a compressed audio information portion and at least one information packet, specifying when at least one of the plurality of periodically-occurring holes will occur in the third signal;

in the base unit:

(a) receiving the first signal;

(b) decoding the first signal to provide a reconstructed information signal that is substantially identical to the information signal;

(d) transmitting the reconstructed information signal to at least the telephone network interface;

(e) detecting a need for an interruption of the first signal by detecting the second signal from the telephone network interface;

(f) producing a first interruption request;

(g) transmitting the first interruption request to the mobile unit at a time when at least one of the plurality of periodically-occurring holes is occurring in the first signal, as specified by an information packet that is received by the base unit;

(h) receiving the acknowledgement signal transmitted by the mobile unit; and (i) processing the acknowledgement signal within the base to determine whether to transmit;

(j) interrupting the transmission of the mobile communication unit when a determination is made to transmit, so that the telephone network interface may begin transmitting information through the base;

(k) receiving the second interrupt request from the mobile communication unit;

(l) transmitting the audio information portion of the third signal to at least the telephone network interface;

in the telephone network interface:

(a) receiving the reconstructed information signal;

(b) transmitting a second signal comprising an audio information portion to the base; and (c) receiving the audio information portion of the third signal sent by the base and providing the audio information portion of the third signal to at least a user of the telephone network interface.

12. The method of claim 11, further comprising the step of:

in the mobile communication unit:

(f1) extending the duration of the hole occurring at the time that the mobile communication unit detects the detected portion of the interruption request signal, when the detected portion complies with the first set of predetermined criteria, to read the interruption request signal.

13. The method of claim 11, wherein step (a) in the telephone network interface comprises the steps of:

(a1) initiating an interruption of the transmission by applying an audio signal to an audio-operated-switch; and (a2) storing a portion of the audio signal.

14. The method of claim 12 wherein the first set of predetermined criteria of step (f) in the mobile communication unit comprises: whether the interruption request signal is of at least a predetermined level.

15. The method of claim 12, wherein the the first set of predetermined criteria of step (f) in the mobile communication unit comprises: whether correlation of the interruption request signal to an expected signal produces a value that is of at least a predetermined quantity.

16. In a quasi-duplex communication system comprising first and second mobile communication units, and a repeater, a method of interrupting a transmission comprising the steps of:

in the first mobile communication unit:

(a) receiving an information signal;

(b) transmitting a first signal, having a plurality of periodically-occurring holes of a predetermined duration, the first signal comprising an audio information portion, representing the information signal, and at least one information packet, specifying when at least one of the plurality of periodically-occurring holes will occur in the first signal;

(c) receiving at least a portion of an interruption request signal;

(d) processing the interruption request signal, to determine whether the interruption request signal complies with predetermined criteria;

(e) transmitting an acknowledgement signal when it determines that the interruption request signal complies with the predetermined criteria, the acknowledgement signal allowing an interruption of the transmission;

(f) interrupting the transmission by the first mobile communication unit so that the second mobile unit may begin transmitting signals through the repeater;

in the repeater:

(a) receiving the first signal;

(b) approximating the parts of the information signal that were removed from the holes in the first signal, to produce approximate information;

(c) filling the holes with the approximate information to produce a continuous first signal (d) transmitting the continuous first signal to a second mobile unit;

(e) receiving the interruption request signal;

(f) transmitting the interruption request signal to the first mobile unit;

(g) receiving the acknowledgement signal to the second mobile unit; and (h) transmitting the acknowledgement signal to the second mobile unit;

(i) receiving a second signal;

(j) approximating the information that was removed from the holes in the second signal to produce approximate information;

(k) filling the holes in the second signal with the approximate information, to produce a continuous second signal (l) transmitting the continuous second signal to the first mobile unit;

in the second mobile communication unit:

(a) receiving the continuous first signal;

(b) transmitting an interruption request signal, at a time specified by an information packet;

(c) receiving the acknowledgement signal; and (d) transmitting the second signal comprising a plurality of periodically-occurring holes of a predetermined duration, an audio information portion and at least one information packet, specifying when at least one of the plurality of periodically-occurring holes will occur in the second signal.

17. The method of claim 16 further comprising the step of:
in the first mobile communication unit:
(c1) extending the duration of the hole occurring at the time that the first mobile communication unit receives the portion of the interruption request signal to read the interruption request signal.

18. In a quasi-duplex communication system comprising first and second mobile communication units, and a repeater, a method of interrupting a transmission comprising the steps of:
in the first mobile communication unit:
(a) receiving an information signal;
(b) sampling the information signal at a first rate to produce a sampled information signal;
(c) storing the sampled information signal;
(d) modulating the sampled information signal at a second rate to produce a compressed audio information portion;
(e) transmitting a first signal, having a plurality of periodically-occurring holes of a predetermined duration, the first signal comprising the compressed audio information portion, representing the information signal, and at least one information packet, specifying when at least one of the plurality of periodically-occurring holes will occur in the first signal, each hole occurring during a gap in the first signal caused by compression of the audio information portion;
(f) detecting at least a portion of an interruption request signal to determine whether the detected portion complies with a first set of predetermined criteria;
(g) processing the interruption request signal, to determine whether the interruption request signal complies with a second set of predetermined criteria;
(h) transmitting an acknowledgement signal when the first mobile unit determines that the interruption request signal complies with the predetermined criteria, the acknowledgement signal allowing an interruption of the transmission;
(i) interrupting the transmission made by the first mobile communication unit so that the second mobile unit may begin transmitting information through the repeater;
in the repeater:
(a) receiving the first signal;
(b) decoding the first signal to provide a reconstructed information signal that is substantially identical to the information signal;
(c) transmitting the reconstructed information signal to at least the second mobile communication unit;
(d) receiving the interruption request signal;
(e) transmitting the interruption request signal to at least the first mobile communication unit;
(f) receiving the acknowledgement signal transmitted by the first mobile communication unit; and
(g) transmitting the acknowledgement signal to the second mobile communication unit;
(h) receiving the second signal;
(i) transmitting the continuous second signal to the first mobile communication unit;
in the second mobile communication unit:
(a) receiving the continuous first signal;
(b) transmitting an interruption request signal, at a time specified by an information packet;
(c) receiving the acknowledgement signal; and
(d) transmitting a second signal comprising information, having a plurality of periodically-occurring holes of a predetermined duration, the second signal comprising an audio information portion and at least one information packet, specifying when at least one of the plurality of periodically-occurring holes will occur in the second signal.

19. The method of claim 18, further comprising the step of:
in the first mobile communication unit:
(f1) extending the duration of the hole occurring at the time that the first mobile communication unit receives the detected portion of the interruption request signal, the detected portion of the interruption request signal complies with the first set of predetermined criteria, to read the interruption request signal.

20. The method of claim 18, further comprising the steps of:
in the second mobile communication unit:
(a1) initiating an interruption of the transmission by applying an audio signal to a audio-operated-switch; and
(a2) storing a portion of the audio signal; and
(d) transmitting a second signal, the second signal comprising the portion of the voice signal that was stored.

21. The method of claim 19, wherein the first set of predetermined criteria of step (f) in the first mobile communication unit comprises: whether the interruption request signal is of at least a predetermined level.

22. The method of claim 19, wherein the first step of predetermined criteria of step (f) in the first mobile communication unit comprises: whether correlation of the interruption request signal to an expected signal produces a value that is of at least a predetermined quantity.

23. A first communication unit comprising:
means for receiving an information signal;
means for transmitting a first signal, having a plurality of periodically-occurring holes of a predetermined duration, the first signal comprising an audio information portion, representing the information signal, and at least one information packet, specifying when at least one of the plurality of periodically-occurring holes will occur in the first signal;
means for detecting at least a portion of an interruption request signal that is sent by a second communication unit, to determine whether the portion complies with a first set of predetermined criteria; and
means for interrupting transmission of the first signal, so that the second communication unit may begin transmitting information to be received by at least the first communication unit.

24. The first communication unit of claim 23 further comprising:
means for extending the duration of the hole occurring at the time that the first communication unit detects the detected portion of the interruption request signal when the detected portion of the interruption request signal complies with the first set of predetermined criteria;

means for processing the interruption request signal to determine whether the interruption request signal complies with a second set of predetermined criteria; and means for transmitting an acknowledgement signal when the first communication unit determines that the interruption request signal complies with the second set of predetermined criteria, the acknowledgement signal allowing the second communication unit to interrupt the transmission.

* * * * *